United States Patent [19]
Leftwich

[11] Patent Number: 5,697,662
[45] Date of Patent: Dec. 16, 1997

[54] SEAT SUPPORT FOR A MOTOR VEHICLE

[75] Inventor: William B. Leftwich, Elkhart, Ind.

[73] Assignee: Glaval Corporation, Elkart, Ind.

[21] Appl. No.: 595,803

[22] Filed: Feb. 2, 1996

[51] Int. Cl.$^6$ ........................................................ B60N 2/00
[52] U.S. Cl. .......................... 296/63; 248/503.1; 297/475
[58] Field of Search ........................ 296/63, 64, 65.1, 296/68.1, 69; 248/503.1; 297/475, 476, 477, 478

[56] References Cited

U.S. PATENT DOCUMENTS

| | | | |
|---|---|---|---|
| 3,761,127 | 9/1973 | Giese et al. | 296/68.1 X |
| 4,836,597 | 6/1989 | Izumida | 296/63 |
| 4,971,379 | 11/1990 | Rumpel et al. | 296/63 |

*Primary Examiner*—Andrew C. Pike
*Attorney, Agent, or Firm*—Baker & Daniels

[57] ABSTRACT

A seat support for a motor vehicle includes a mounting plate permanently secured to the floor of the vehicle and a riser releasingly mounted on the mounting plate. The plate and the riser have cooperating sliding surfaces wherein the riser is slidably supported for movement on the plate between released and latch positions. As the riser moves into the latched position, open-ended slots on feet extending from the riser engage pins on the plate, thereby securing the riser to the plate. Primary and secondary locking mechanisms lock the riser on the plate and tighten engagement between the riser and the plate. The locking mechanisms engage semi-resilient sleeves on the pins to prevent rattling.

17 Claims, 6 Drawing Sheets

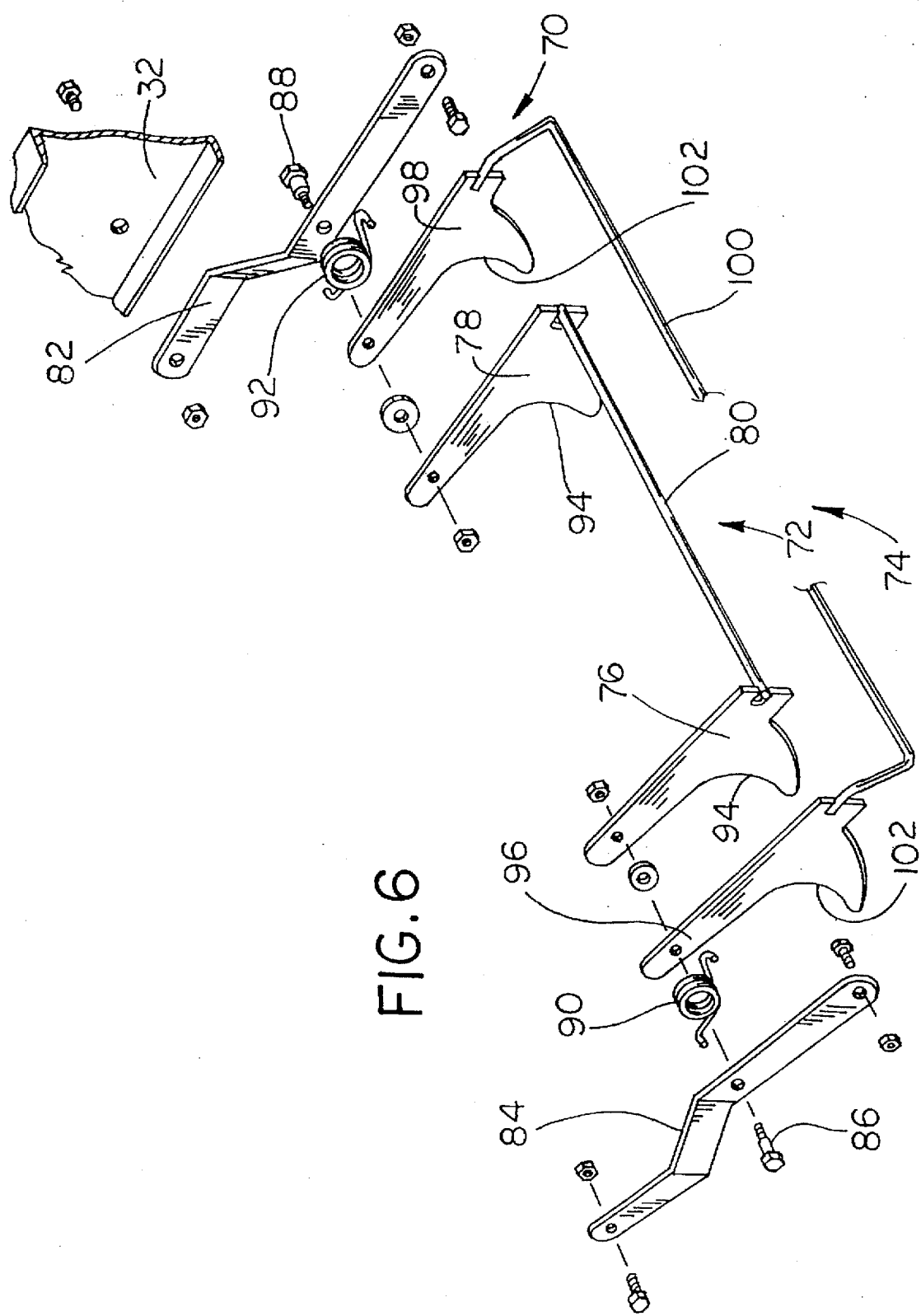

SEAT SUPPORT FOR A MOTOR VEHICLE

This invention relates to a seat support for a motor vehicle, such as an automobile, van, or recreational vehicle.

Motor vehicles, such as converted vans and other recreational vehicles, are commonly equipped with individualized luxurious seating. Such seating must include seat supports for mounting the seating in the vehicle, but such seat supports must not interfere with or detract from the attractive and luxurious padded seating. However, the seat supports must nevertheless be sufficiently secured to the vehicle body and chassis that governmental safety requirements are met, including the governmental requirements that specify the forces which must be withstood by the seat supports during an accident. Furthermore, it is desirable that the seating be easily removed from the vehicle, to thereby convert the vehicle from a passenger vehicle into a cargo hauling vehicle. The seating is heavy and cumbersome, and it is difficult to manipulate the seating into a position where it can be latched and retained on the vehicle. Furthermore, it is necessary to firmly secure the seating in the vehicle in a manner that rattling and other noises will not be present.

According to the present invention, a mounting plate is permanently installed on the vehicle floor at locations where the seats are to be installed. The mounting plate is relatively thin, and does not protrude appreciably above the level of the floor even though it is bolted in place on the floor. A seat riser supports a seat and can be removably installed on the mounting plate. The seat riser includes apertured feet that extend into recesses provided on the mounting plate. Sliding surfaces on the mounting plate and the riser permit the riser to slide relative to the plate between a released and latched position. Pins within the recesses are wrapped in a nylon sleeve, and are positioned such that the riser is raised slightly so that the sliding surfaces are disengaged from one another as the riser is moved into the latched position. A primary latching lever is spring loaded to drive a camming surface around the edges of two of the pins that are engaged with the slots in the feet. A secondary clamping lever is manually actuated and takes up clearances between the pins and the feet to firmly lock the riser on the mounting plate thereby preventing movement between the riser and the mounting plate so that rattles are substantially eliminated.

These and other advantages of the present invention will become apparent from the following description, with reference to the accompanying drawings, in which.

Figure 1:
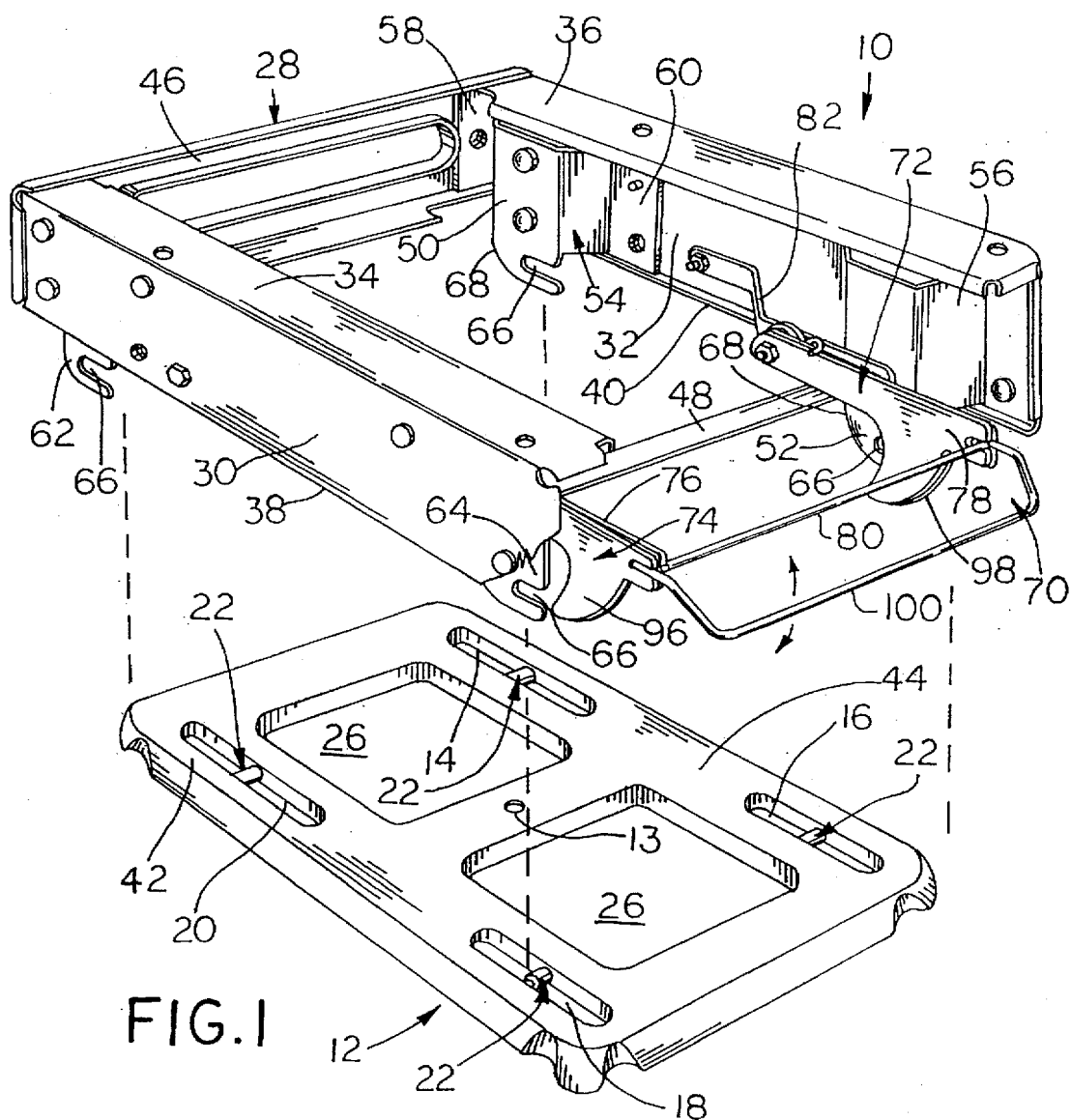
FIG. 1 is an exploded view in perspective illustrating the riser and mounting plate comprising the seat support made pursuant to the teachings of the present invention.
Figure 2:
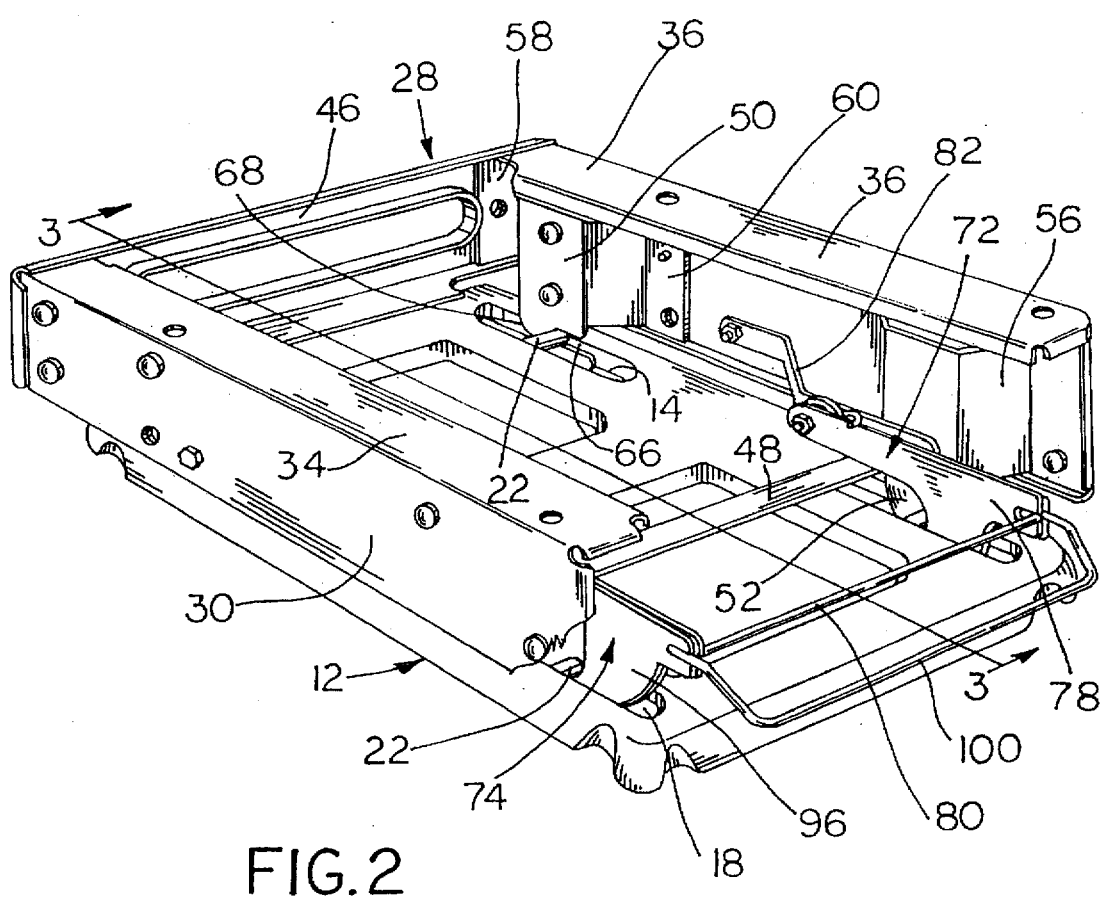
FIG. 2 is a view in perspective of the riser installed on the mounting plate.
Figure 3:
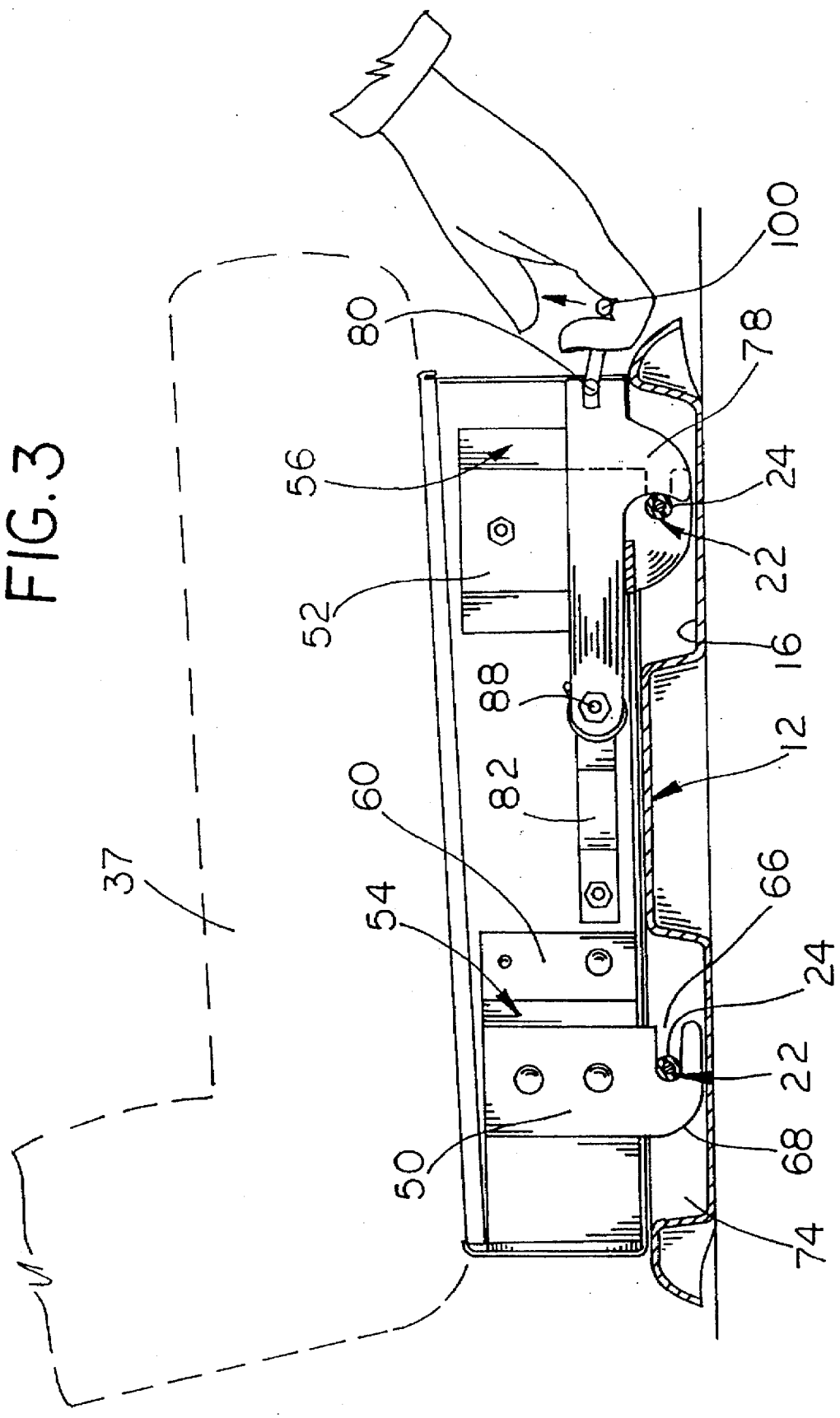
FIG. 3 is a partial cross sectional view taken substantially along lines 3—3 of FIG. 2, but with the seating installed on the riser.
Figure 4:
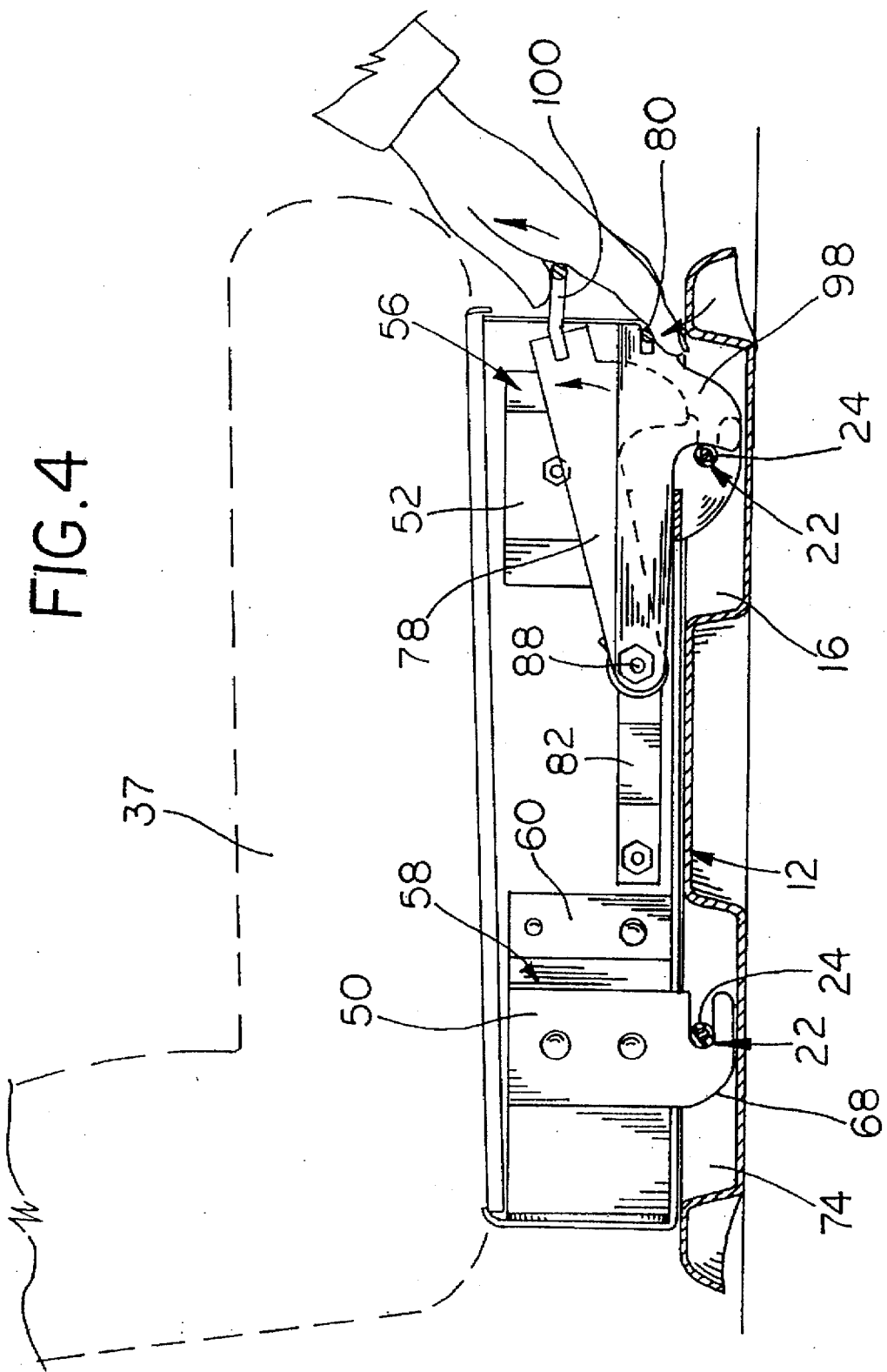
FIG. 4 is a view similar to FIG. 3 but illustrating the position of the secondary latching member after it has been released but before the spring and gravity loaded primary lever has been released when the seat is to be removed from the vehicle.
Figure 5:
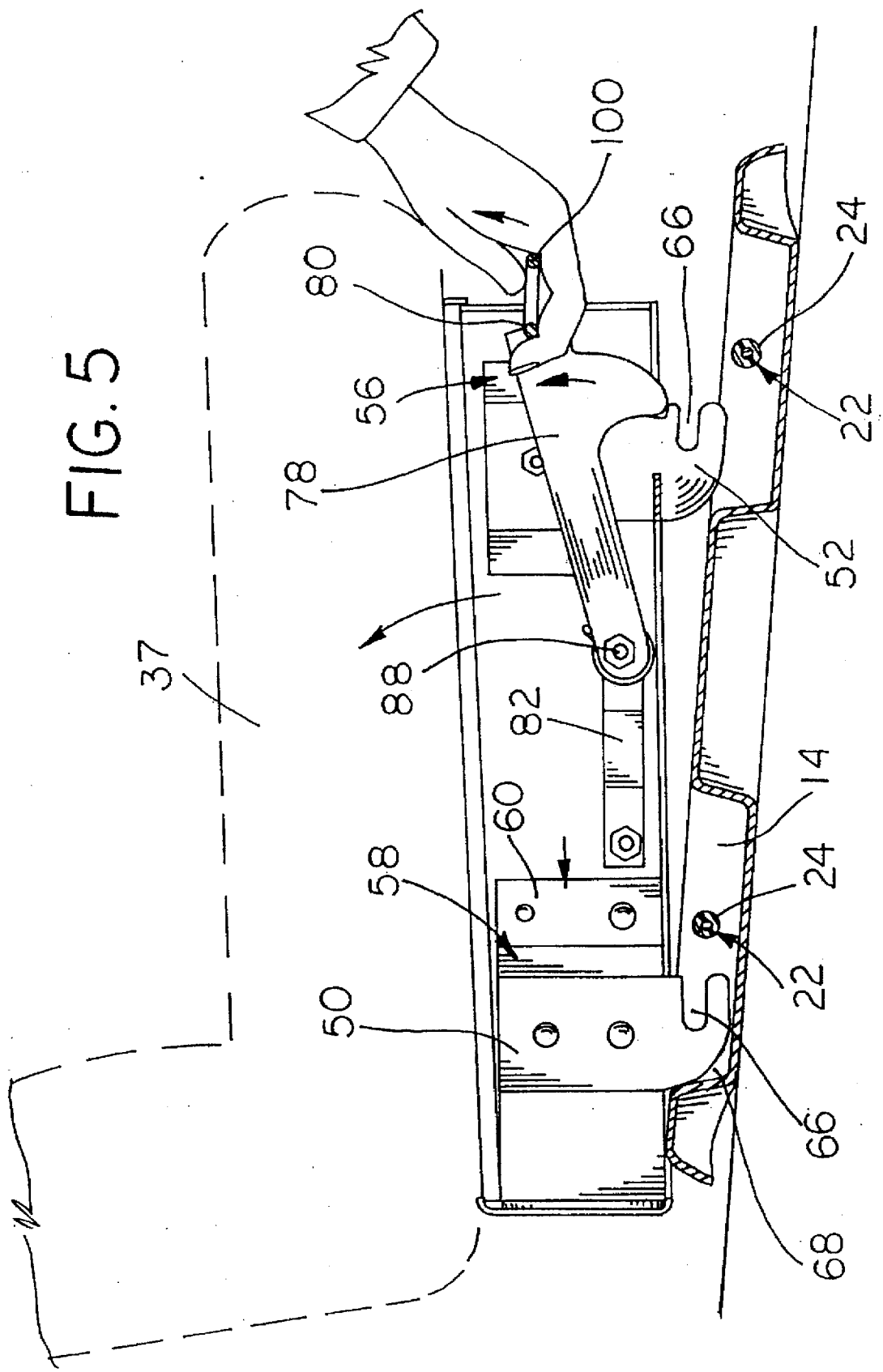

FIG. 5 is a view illustrating both the primary and secondary latching lever moved to the released position and the seat riser moved out of engagement with the pins in the plate just before the seat and seat riser are rotated into a position permitting removal of the seat and seat riser from the vehicle; and FIG. 6 is an exploded view in perspective of the locking mechanism used in the seat support illustrated in FIGS. 1–5.

Referring now to the drawings, a seat support for a motor vehicle generally indicated by the numeral 10 includes a mounting plate 12 which is designed to be permanently mounted on the floor of the motor vehicle by, for example, bolting through holes (not shown). The plate 12 further includes recesses 14, 16, on one side thereof, and recesses 18 and 20 on the other side thereof. The recesses are of a height substantially the same as that of the plate 12. Each of the recesses 14, 16, 18, and 20 includes a pin 22 extending transversely across the recess at approximately the midpoint thereof. Each of the pins 22 is circumscribed by a bushing 24, which is made of a semi-resilient, durable, plastic material, such as nylon 12. The portions of the mounting plate 12 between the recesses are cut away to define openings 26, primarily to save weight.

Seat support 10 further includes a riser generally indicated by the numeral 28. The riser 28 includes a pair of longitudinally extending side plates 30 and 32. Each of the side plates 30 and 32 carries an upper horizontally extending flange 34, 36. Conventional seating, such as the seating 37, is mounted on the flanges 36 and 34. Each of the side plates 30 and 32 further carries a bottom flange that defines lower sliding surfaces 38, 40. As will be hereinafter explained, the sliding surfaces 38 and 40 are designed to slidably engage sliding surfaces 42 and 44, which are defined on the mounting plate 12. The sliding surface 42 is defined between the recesses 18 and 20 and the corresponding edge of the plate 12, and the sliding surface 44 is defined between the recesses 14 and 16 on the opposite side of the mounting plate 12. The riser 28 includes a rear cross plate 46 which interconnects the side plates 30 and 32. A cross brace 48 also interconnects the side plates 30 and 32 to further rigidify the riser 28. Engagement feet 50, 52 are riveted to brackets 54, 56 which are secured to the side plate 32. It will be noted that the bracket 54 includes a wraparound portion 58 that extends onto the rear cross plate 46. Portion 58 reinforces the cross plate 46 at a point where a seat belt retractor (not shown) is attached to the riser 28. Similarly, the bracket 54 includes a portion 60 reinforcing the corresponding portion of the side plate 32 where the seat belt arm is pivotally attached thereto. Accordingly, the seat belt assembly is attached to the riser 28 so that the entire seat belt is installed and removed from the vehicle with the seat. A foot 62 is mounted on the side plate 30 opposite the foot 50 on a bracket (not shown) similar to the bracket 54. Another seat belt attachment point is defined on plate 30 and is reinforced by the bracket mounting the foot 62 on plate 30. A foot 64 is mounted on the side plate 30 opposite the foot 52, on a bracket (not shown) similar to the bracket 56. Each of the feet 50, 52, 62, 64 defines an open-ended slot 66 adjacent the lower end thereof. As will be described hereinafter, the pins 22 on the mounting plate 12 are adapted to be received within the open-ended slot 66 when the riser 28 is installed on the mounting plate 12. Furthermore, each of the feet 50, 52, 62 and 64 includes a curved camming surface 68 on the lower edge and side portions thereof, opposite the slot 66. The curved surface 68 facilitates entry of the feet into the recesses 14, 16, 18, and 20 and also permits the riser to rock about the surfaces 68 on the feet 50, 62 so that the seat and riser may be tilted to facilitate removal of the seat and riser from the vehicle and reinstallation of the seat and riser into the vehicle. Both the mounting plate 12 and the riser 28 are symmetrical; accordingly, the riser can be installed on the mounting plate with the seating facing in either direction. Furthermore, multiple sets of recesses can be provided in mounting plate 12, to permit the fore- and -aft position of the riser 36 to be varied.

A latching and locking mechanism generally indicated by the numeral 70 secures the riser 28 on the base plate 12. The locking or latching mechanism 70 includes a primary latch generally indicated by the numeral 72 and a secondary locking mechanism generally indicated by the numeral 74. The primary latching mechanism 72 includes a pair of levers 76, 78 which are interconnected by a handle 80. One end of a bracket 82 is secured to the side plate 32, and the opposite end of the bracket 82 is secured to the bracket 56. A similar bracket 84 is bolted to the side plate 30 and to the bracket (not shown) which carries the foot 64. The lever 76 is pivotally attached to the bracket 84 by pivot pin 86, and the lever 78 is pivotally attached to the bracket 82 by pivot pin 88. Coil springs 90, 92 are also wrapped around the pivot pins 86 and 88 respectively and yieldably urge their corresponding levers 76 and 78 downwardly viewing the figures. Each of the levers 76, 78 of the primary latch 72 and levers 96, 98 of the secondary latching mechanism 74 defines a camming surface 94 which is adapted to engage the pins 22 and the recesses 18 and 16 respectively, as will hereinafter be described.

The secondary latching member 74 includes the pair of secondary levers 96, 98 interconnected by a handle 100. Each of the secondary levers 96, 98 are pivotally connected to the corresponding bracket 84, 82 through the pins 86, 88 such that the lever arms 96, 98 rotate about a common pivot point with the primary levers 76, 78. Each of the secondary levers 96, 98 carry a camming surface 102 which is similar to the camming surfaces 94 on the primary levers 76, 78. As will be described hereinafter, the camming surfaces 102 rotate about a tighter radius than do the camming surfaces 94, such that the springs 90, 92 can urge the lever arms 76, 78 of the primary latching mechanism 72 in the position where they retain the riser 28 in place, and the camming surfaces 102 engage the pins 22 in the recesses 16 and 18 when the handle 100 is forcibly moved downward. The handle 100 extends downwardly such that it can be manipulated separately from the handle 80. Furthermore, the clearance between the handle 80 and the base plate 12 when the riser is installed on the base plate is such that it is not possible to insert a foot of a passenger under the handle, and thus it is also impossible to operate the handles accidentally.

In operation, when the seat 37 is installed in the vehicle, the riser 28 upon which the seat 37 is mounted is manipulated into position over the mounting plate 12. The feet 62, 50 are dropped into the recesses 20 and 14 respectively, just behind the pins 22 viewing FIG. 1. The seat can then be rotated about the curved surfaces 68 to lower the feet 64 and 52 in positions in the recesses 18 and 16 respectively. Accordingly, when each of the feet 50, 52 and 62, 64 are located in their respective slots 14, 16 and 20, 18 the riser 28 is slidable on the mounting plate 12 by engagement of the sliding surface 38 on the riser with the sliding surface 42 on the base place 12 and by engagement of the surface 40 on the riser with the surface 44 on the base plate. The riser 28 is then shifted relative to the base plate 12 to engage the slots 66 of the feet with the pins 22. It will be noted that as the pins 22 engage the slots 66, because of the relative location of the slots 66 with respect to the sliding surfaces 38 and 40, the sliding surfaces 38, 40 of the riser will be elevated slightly above sliding surfaces 42 and 44 of the plate 12 and the riser will be supported solely by the engagement of the pins 22 and into the slots 66. Accordingly, installation of the riser on the base plate is not hindered by any slight warpage of the base plate, and the resiliency of the nylon sleeves or bushings takes up any clearance between the slots 66 and the pins 22, since the nylon is slightly deformable although strong enough that it will withstand repeated installations and removals of the riser. The resiliency of the bushing also prevents rattling between the pins 22 and the slots 66, and the fact that the riser is elevated off of the sliding surfaces of the base plates prevents rattling between these components.

As the riser is shifted along the base plate to engage the pins 22 with the slots 66, the springs 90 and 92 urge the levers 78 downwardly so that the camming surfaces 94 engage the pins 22 just as the pins reach the latching position adjacent the ends of the open-ended slots 66. The clearances between the camming surfaces 94 and the pins 22 are designed to be sufficiently large that the springs 90 and 92 are capable of urging the primary latching means 72 into a position locking the riser to the base plate 12 thus preventing relative movement therebetween to any appreciable degree. However, the slight movement of the riser with respect to the base plate permitted by the primary latching mechanism 72 will result in annoying rattles. Accordingly, the secondary latching mechanism 74 is provided to take up any clearance between the closed end of the slot 66 and the pin 22, thereby locking the riser 28 firmly in place on the base plate 12. Accordingly, the camming surfaces 102 are sized such that when the lever 100 is operated manually to force the lever arms 96 and 98 downwardly, the curved surfaces 102 force the closed end of the slots 66 against the pins 22 such that relative movement between the riser and the plate will be prevented.

When the seat is to be removed from the vehicle, both the handle 80 and the handle 100 are operated to raise the levers 96, 98 and 76, 78 away from the pins 22 in the recesses 16 and 18 as most clearly illustrated in FIG. 5. Accordingly, the riser 28 may be moved relative to base plate 12 to the left viewing the figures, until the slots 66 disengage from the pins 22. As illustrated in FIG. 5, the seat 37 can be rotated about the curved surfaces 68 on the feet 50 and 62, thereby permitting the seat to be easily be removed from the van. It will be noted that the surfaces 68 on the feet 50 and 62 are at approximately the center of mass of the seat, so that the seat will be counterbalanced in the FIG. 5 position, permitting easy rotation of the seat.

What is claimed:

1. Seat support for a motor vehicle having a floor comprising a mounting plate permanently secured to said floor, a seat riser releasably mounted on said mounting plate, said plate and said riser having cooperating sliding surfaces wherein said riser is slidably supported for movement relative to said plate between released and latched positions, and a retaining and lifting mechanism for lifting said riser off of the sliding surface of said plate and then securing said riser to said plate as said riser is moved from said released position to said latched position.

2. Seat support as claimed in claim 1, wherein said retaining and lifting mechanism includes recesses in said plate for receiving corresponding feet carried by said riser, and securing means in each of said recesses and on each of said feet for securing said feet within said recesses when the riser is moved into said latched position.

3. Seat support as claimed in claim 2, wherein said securing means includes pins extending across each of said recesses.

4. Seat support as claimed in claim 3, wherein said feet extend from said riser into said recesses, said feet being moved from a disengaged position to an engaged position engaging said pins as the riser is moved from said released position toward said latched position.

5. Seat support as claimed in claim 4, wherein said feet define open-ended slots for engaging said pins as said riser is moved into said latched position.

6. Seat support as claimed in claim 4, wherein said pins carry resilient sleeves engaging said feet as said riser is moved into said latched position.

7. Seat support as claimed in claim 4, wherein said riser includes locking means for locking said riser on said plate after the riser has been moved into said latched position.

8. Seat support as claimed in claim 7, wherein said locking means includes a primary lever pivotally mounted for movement into a locking position engaging said pins after said feet are engaged with the pins as the riser is moved into the latched position.

9. Seat support as claimed in claim 8, wherein said feet define open-ended slots for engaging said pins as said riser is moved into said latched position, said lever including a camming surface engaging at least one of said pins after the pins have engaged the slots in said feet for locking the riser in the latched position.

10. Seat support as claimed in claim 9, wherein a spring yieldably urges said lever into a position wherein said camming surface engages said one pin when the riser is in the latched position.

11. Seat support as claimed in claim 10, wherein said lever includes a pair of lever members pivotally mounted on opposite sides of said riser and a handle interconnecting said lever members for pivoting both of said lever members, said lever members each carrying a camming surface for engaging a corresponding one of said pins when the riser is in the latched position.

12. Seat support as claimed in claim 10, wherein said locking means further includes a manually actuated secondary latching lever engaging said one pin after said primary lever has engaged said one pin, said secondary latching lever urging said riser relative to said plate after said primary lever has engaged said one pin to take up clearances between said pins and the slots.

13. Seat support as claimed in claim 4, wherein at least a second one of said feet is mounted on a reinforcing mounting bracket secured to said riser, and said seat support further comprises seat belt attachment means extending through said riser and said bracket for securing a seat belt to said riser.

14. Seat support as claimed in claim 1, wherein said riser includes locking means for locking said riser on said plate after the riser has been moved into said latched position.

15. Seat support as claimed in claim 14, wherein said locking means includes a lever pivotally mounted for movement into a locking position for preventing movement of said riser out of said latched position until the lever is moved out of the locking position.

16. Seat support for a motor vehicle having a floor comprising a mounting plate permanently secured to said floor and a seat riser releasably mounted on said mounting plate whereby the seat riser can be released from the mounting plate, said riser including a pair of side plates and a cross plate interconnecting said side plates, said riser further including reinforced portions for attaching a seat belt assembly having a retractor mounting point and a pair of belt mounting points, said retractor mounting point being defined on said cross plate and one of said seat belt mounting points being defined on each of said side plates, thereby permitting the seat belt assembly to be installed and removed with the riser.

17. The seat support as claimed in claim 16, wherein said riser further includes feet extending from said side plates and into recesses on said mounting plate, said feet being mounted on brackets secured to said side plates, one of said brackets including a portion extending from a corresponding said side plate onto said cross plate and reinforcing said seat belt retractor mounting point on said cross plate.

* * * * *